United States Patent
Yates et al.

(10) Patent No.: US 7,607,906 B2
(45) Date of Patent: Oct. 27, 2009

(54) GEAR PUMP ARRANGEMENT WITH EROSION RESISTANT INSERT

(75) Inventors: Martin Kenneth Yates, East Haddon (GB); Glyn Edward Dixon, Cheltenham (GB)

(73) Assignee: Goodrich Control Systems Limited (GB)

( * ) Notice: Subject to any disclaimer, the term of this patent is extended or adjusted under 35 U.S.C. 154(b) by 392 days.

(21) Appl. No.: 11/433,098

(22) Filed: May 12, 2006

(65) Prior Publication Data
US 2007/0264148 A1    Nov. 15, 2007

(30) Foreign Application Priority Data
May 13, 2005    (GB) .................................. 0509866.0

(51) Int. Cl.
F03C 2/00  (2006.01)
F03C 4/00  (2006.01)
F04C 18/00  (2006.01)

(52) U.S. Cl. .................. 418/206.7; 418/132; 418/206.8; 418/178; 418/179

(58) Field of Classification Search .............. 418/206.1, 418/206.4, 206.6, 206.7, 206.9, 178, 179, 418/1, 132, 135; 384/162, 427
See application file for complete search history.

(56) References Cited
U.S. PATENT DOCUMENTS

| 307,335 A | 10/1884 | Richards |
| 1,991,562 A * | 2/1935 | Lucas .......................... 384/427 |
| 3,632,240 A | 1/1972 | Dworak |
| 4,036,540 A | 7/1977 | Seufert |
| 4,184,722 A * | 1/1980 | Henniges ..................... 384/162 |
| 4,253,808 A | 3/1981 | White |
| 4,523,365 A | 6/1985 | Richmond |
| 6,716,010 B2 | 4/2004 | Eaton et al. |
| 2003/0053923 A1* | 3/2003 | Eaton et al. ................. 418/132 |

FOREIGN PATENT DOCUMENTS

| FR | 2027192 | 9/1970 |
| GB | 2262576 | 6/1993 |
| SU | 1360951 A * | 12/1987 |

OTHER PUBLICATIONS

European Search Report dated Jun. 19, 2008.

* cited by examiner

*Primary Examiner*—Theresa Trieu
(74) *Attorney, Agent, or Firm*—Andrus, Sceales, Starke & Sawall, LLP

(57) ABSTRACT

A gear pump arrangement comprising a pair of intermeshing gears (16, 18) located between bearing blocks (24) and rotatable to pump fluid from an inlet (12) to an outlet (14), wherein at least one of the bearing blocks (24) comprises a body (28) formed with a recess (32) within which an insert (34) is located, the recess (32) and insert (34) being shaped so as to be of smaller dimensions at a bearing surface (30) of the bearing block (24) than at a point remote therefrom.

9 Claims, 2 Drawing Sheets

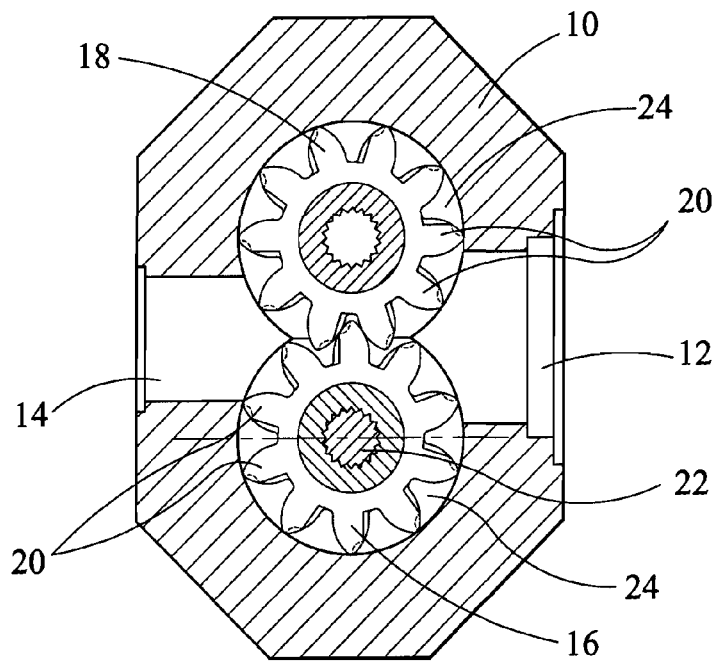
FIG 1
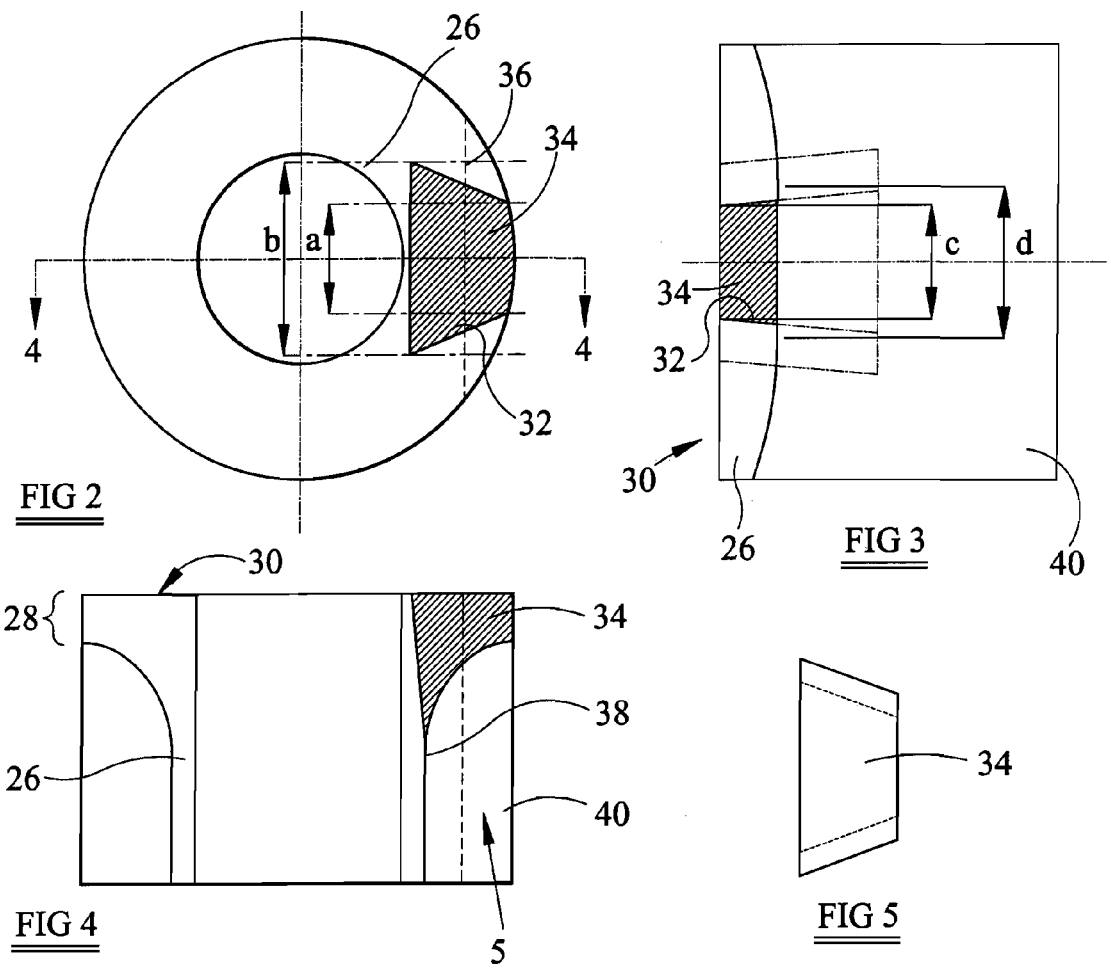
FIG 2
FIG 3
FIG 4
FIG 5

GEAR PUMP ARRANGEMENT WITH EROSION RESISTANT INSERT

This invention relates to a gear pump arrangement, and in particular to a bimetallic gear pump bearing block.

Gear pumps are in common use in the fuel systems of engines, for example aircraft engines. Such pumps comprise a pair of intermeshing gears, one of which is arranged to drive the other, rotation of the gears driving fluid from a low pressure inlet side of the pump to a high pressure, outlet side thereof.

The intermeshing teeth of the gears define cavities, and the volumes of the cavities vary as the teeth mesh during rotation of the gears, increasing and decreasing the pressure of the fluid located therein. This can result in gas bubbles forming, and subsequently collapsing, in the liquid and this can give rise to cavitation erosion of the pump. The bearing surfaces of the bearing blocks against which the gears are intended to run are commonly of a lead bronze material and are particularly susceptible to such erosion.

It is known to provide the bearing surfaces with inserts of a material of improved erosion resistance. One way in which this has been achieved is by locating a peg of an erosion resistant material, typically a stainless steel, in a suitably sized and positioned opening or recess in the bearing block, the peg being an interference fit and further being held in position by a retaining pin. However, cavitation erosion of the surrounding bearing block may result in a leakage path being formed between the peg and the bearing block resulting in inefficient pump operation and necessitating premature replacement of the bearing blocks. Obviously this is undesirable. Further, if particularly high levels of erosion occur, the peg may become loose and this could lead to damage to the teeth of the gears.

Rather than locate a peg of cavitation erosion resistant material in this manner, it is known to cast an insert of such a material into the bearing block during manufacture thereof. This has the advantage that a greater area of the bearing block can be of erosion resistant material, and that the insert can be designed in such a manner that it cannot work loose. The manufacturing method used is such that the insert and surrounding part of the bearing block are flush with one another. This is advantageous in that the formation of a leakage path between the high and low pressure parts of the pump is avoided, but does mean that the gears run against the inserts rather than just against the lead bronze bearing block material. U.S. Pat. No. 6,716,010 describes this manufacturing method in greater detail.

It may be desirable to use aluminium bronze as the material of the insert as it has a good cavitation erosion resistance and also has comparatively good bearing properties. Unfortunately aluminium bronze has too low a melting point to allow it to be cast into a bearing block of lead bronze as described hereinbefore.

It is an object of the invention to provide an alternative bimetallic gear pump bearing block in which an insert of an erosion resistant material, for example aluminium bronze, can be used.

According to the present invention there is provided a gear pump arrangement comprising a pair of intermeshing gears located between bearing blocks and rotatable to pump fluid from an inlet to an outlet, wherein at least one of the bearing blocks comprises a body formed with a recess within which an insert is located, the recess and insert being shaped so as to be of smaller dimensions at a bearing surface of the bearing block than at a point remote therefrom.

The recess and insert may further be shaped so as to be of smaller dimensions at a point close to the edge of the bearing block than of a point remote therefrom.

The recess and insert are conveniently of stepped form. Alternatively, they may be of tapering shape, for example of double dove-tailed form. However, other shapes are also possible.

Where the recess and insert are of stepped form, they are conveniently of stepped generally cylindrical or stepped part-cylindrical form.

It will be appreciated that such an arrangement allows the insert to be mechanically retained by the bearing block with little if any risk of the insert becoming loose.

The insert may be of aluminium bronze. As a result, the benefits of using a material of good cavitation erosion resistance and good bearing properties can be achieved.

The insert is preferably flush or substantially flush with the bearing surface. As a result the formation of a fluid leakage path between the high and low pressure parts of the pump is avoided.

The bearing block may be provided with an aluminium filled recess. The aluminium may serve to prevent the insert being released from its recess.

The invention also relates to a bimetallic bearing block for use in the gear pump arrangement defined hereinbefore, the bearing block defining a recess within which an insert is located, the insert and recess being shaped as described hereinbefore.

The invention also relates to a method of manufacture of a bimetallic bearing block of the type described hereinbefore comprising introducing the insert into the recess of the bearing block and flame spraying aluminium onto the bearing block to prevent release of the insert.

The invention will further be described, by way of example, with reference to the accompanying drawings, in which:

FIG. 1 is a view illustrating part of a gear pump in accordance with an embodiment of the invention;

FIGS. 2 to 5 are plan, side, sectional and diagrammatic views illustrating part of the gear pump of FIG. 1 during the manufacture thereof.

Figure 7:
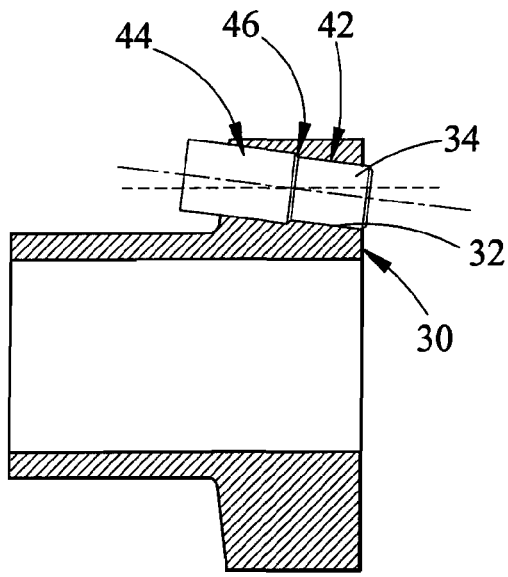
FIGS. 6 to 9 are views similar to FIGS. 2 and 4 illustrating an alternative embodiment at different stages during the manufacture thereof.

FIG. 1 illustrates part of a gear pump for use in, for example, the fuel system of an aircraft engine. It will be appreciated that the pump could be used in other applications. The pump comprises a pump housing 10 defining an inlet port 12 and an outlet port 14. Within the housing 10 is formed a recess housing a pair of gears 16, 18. The gears 16, 18 are both provided with teeth 20 arranged to mesh with one another. One of the gears 16 is mounted upon a drive shaft 22 which is driven for rotation to cause rotation of the gear 16. The other gear 18 is also mounted for rotation within the housing 10. The rotation of the gear 16 causes rotation of the gear 18 by virtue of the intermeshing of the teeth 20.

The housing 10 further houses bearing blocks 24 located at each side of each of the gears 16, 18. Each bearing block 24 is of generally part-cylindrical form, each bearing block 24 having a flat formed thereon which abuts a corresponding flat of another of the bearing blocks 24.

In use, fluid is driven by the gears 16, 18 from the low pressure, inlet side of the pump between the gears 16, 18 and the pump housing 10 to the high pressure, outlet side thereof. The intermeshed teeth 20 and bearing surfaces 30 of the bearing blocks 24 together serve to define isolated chambers which move, upon rotation of the gears 16, 18 and the volume of which change during such movement causing variations in the fluid pressure therein. The variations in fluid pressure can give rise to the formation of bubbles in the liquid in the chambers, and the subsequent collapse of the bubbles.

As the bearing blocks 24 have bearing surfaces 30 against which the gears 16, 18 run, the bearing blocks 24 are conveniently of a material with good bearing properties, for example lead bronze. As described hereinbefore, the collapse of the bubbles due to variations in inter-tooth volumes which occur as the gears 16, 18 rotate may give rise to cavitation erosion of the bearing blocks 24, and in order to counter this it is desired to provide an insert in each bearing block 24 of a material better able to withstand the cavitation erosion.

FIGS. 2, 3 and 4 illustrate one of the bearing blocks 24 partway through the manufacturing process thereof. As illustrated in FIGS. 2 and 4, the bearing block 24 comprises a generally cylindrical body 28 of lead bronze. The lead bronze body 26 has an end region 28, the surface of which defines the bearing surface 30 of the bearing block 24. The region 28 of the body 26 is provided with a recess 32 within which an insert 34 is located, the insert 34 being of a material better capable of withstanding cavitation erosion than the lead bronze material of the body 26. By way of example, the insert 34 may be of aluminium bronze. However, other materials could be used.

The insert 34 and recess 32 within which the insert 34 is located are both of double dove-tail shaped form in that they appear to be of dove-tailed form both as viewed from the bearing surface 30 (as in FIG. 2) and when viewed from the side of the bearing block 24 (as in FIG. 3). In other words, the width of the insert 34 and recess 32 is smaller at the edge of the bearing block 24 (for example dimension a in FIG. 2) than at a point remote therefrom (for example dimension b in FIG. 2), and the width of the insert 34 and recess 32 is smaller at the bearing surface 30 (for example dimension c in FIG. 3) than at a position remote therefrom (for example dimension d in FIG. 3). FIG. 5 is a view of the insert 34 in the direction of arrow 5 in FIG. 4 at this stage in the manufacturing process. It will be appreciated that, by virtue of the double dove-tailed shaping of the insert 34 and recess 32, movement of the insert 34 to the right in the orientation illustrated in FIG. 2 is not permitted, and movement of the insert 34 vertically upwards in the orientation illustrated in FIG. 4 is also not permitted. The insert 34 is thus firmly, mechanically retained in position and so the risk of the insert 34 working loose, in use of the gear pump, is negligible.

During assembly of the body 26 and insert 34, the insert 34 is introduced into the recess 32 in the direction of arrow 5 in FIG. 4. The dimensions of the insert 34 and recess 32 are such that, when the insert 34 has been fully introduced into the recess 32, part of the insert 34 lies flush with the bearing surface 30.

Alternatively, the insert 34 and bearing surface 30 may not, initially, be flush with one another and a machining operation may be carried out to result in the insert 34 and bearing surface 30 lying flush with one another.

After introduction of the insert 34 into the recess 32, a machining operation is carried out upon the assembly to cut away some of the lead bronze bearing block material and part of the insert 34 to form a recess 38, of annular form, and a flame spraying process is used to deposit aluminium 40 into the recess 38 to fill the recess 38. After completion of the flame spraying operation, a machining operation is carried out on the cylindrical body to produce a bearing block of the desired diameter and to form a flat at the location of the dashed line 36 in FIG. 2. It will be appreciated that the formation of the recess 38 filled with aluminium 40 results in a significant weight saving and allows for better matching of thermal expansion rates between the bearing blocks and the associated housing.

The use of aluminium bronze for the insert 34 is advantageous in that aluminium bronze has a good cavitation erosion resistance whilst also having relatively good bearing properties. As the material has relatively good bearing properties, the insert 34 can lie flush with the bearing surface 30 without risk of causing undue wear or damage to the gears 16, 18. As the insert 34 lies flush with the bearing surface 30, the formation of a leakage path direct from the high pressure side of the pump to the low pressure side thereof is avoided. Clearly, the pump efficiency can thus be improved.

As illustrated in FIG. 4, the orientation of one of the dovetails may be angled relative to the axis of the bearing block in order to allow the area of the insert 34 exposed at the bearing surface 30 to be maximised whilst ensuring that the insert 34 does not become too close to the bore of the body 26 through which the mounting shaft of the gears 16, 18 pass.

It will be appreciated that difficulties may be faced in machining the recess 32 and insert 34 to be of precisely the same shape. For example, the recess 32 will have radii at the points of intersection of two side walls, and the insert 34 may be chamfered at these points. As lead bronze is of low stiffness and strength, this is unlikely to be a significant problem as the lead bronze may deform, locally, to compensate for the differences in shape. However, it is possible that leakage paths may be formed between the insert 34 and the recess 32. As any leakage paths so formed are likely to be of very tortuous shape, it is expected that any leakage along such paths will be of relatively low volume. Fluid under high pressure entering the leakage paths could apply loads to the insert urging it out of the recess 32. However, these loads will be countered by the dove-tail design of the insert 34 and recess 32. Further, the location of two bearing blocks 24 in abutment with one another as illustrated in FIG. 1 will counter movement of the insert 34 in one direction. If the formation of such leakage paths is thought to be problematic, then, in addition to securing the insert 34 in position by virtue of the double dove-tail shape of the insert 34 and recess 32, the insert may be soldered to the body 26. As the only purpose of the solder would be to serve as a filler, the mechanical strength of the soldered joint between the insert 34 and body 26 is of little significance.

Although the insert of the arrangement described hereinbefore is of double dove-tailed form, it could be dove-tailed only in one direction, relying upon the engagement of the bearing block with an adjacent bearing block to prevent movement in a direction perpendicular to the axis of the bearing block.

Rather than provide an insert of tapering, for example, dove-tailed or double dove-tailed form, it is thought that it may be desirable to provide an insert of stepped form, the recess being of a corresponding shape. FIGS. 6 to 9 illustrate an alternative bearing block design in which the insert 34, rather than being of double dove-tailed form, is of stepped generally cylindrical form. Likewise, the recess 32 in which the insert 34 is located is of stepped generally cylindrical form.

The insert 34 and recess 32 are both angled to the axis of the bearing block. Each have a relatively small diameter portion 42 located adjacent the bearing surface 30, and a larger diameter portion 44 remote from the bearing surface 30. A step 46 is formed at the intersection of the portions 42, 44. In the arrangement illustrated the step 46 tapers, but this need not always be the case.

Figure 6:
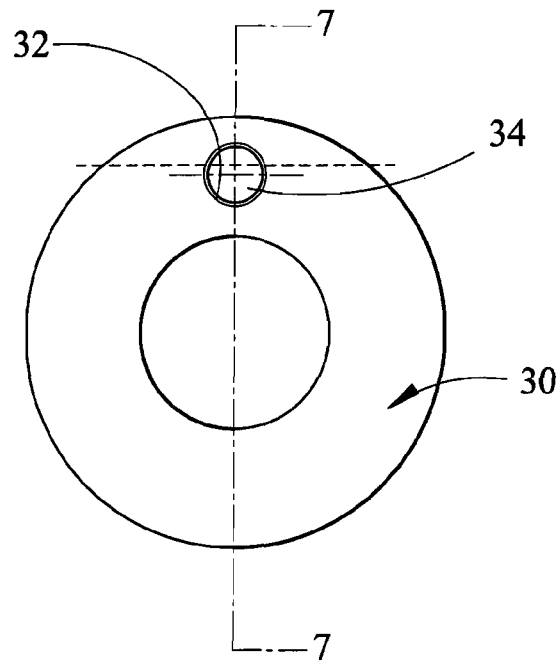
Figure 9:
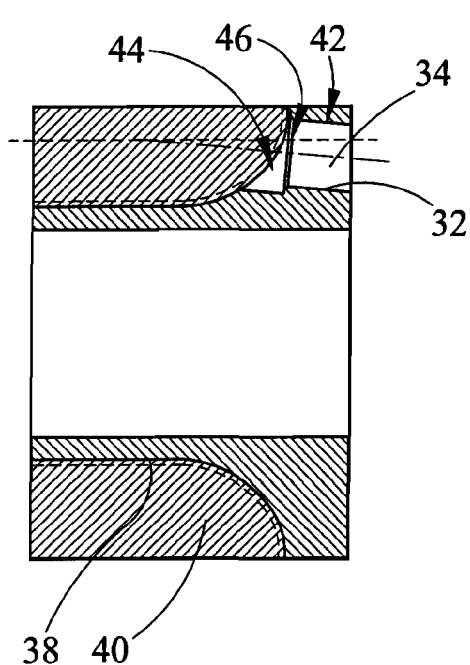
Figure 8:
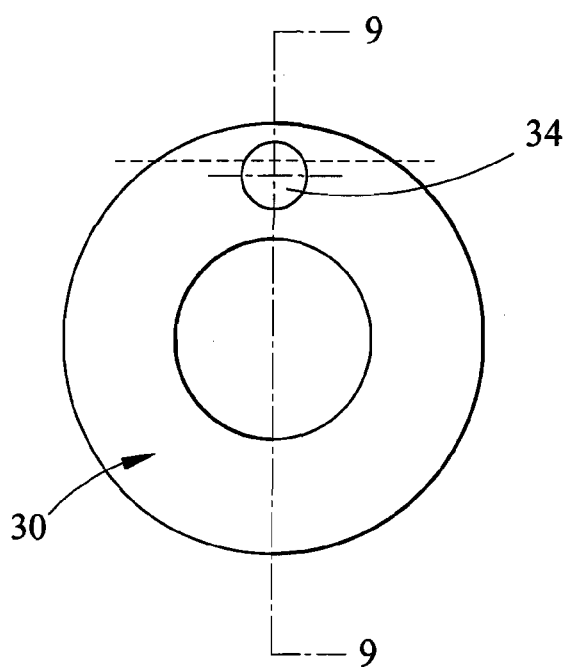

FIGS. 6 and 7 illustrate the insert 34 projecting from both ends of the recess 32. Subsequently, the bearing block and insert are machined to result in one end of the insert 34 lying flush with the bearing surface 30 and to form the recess 38 which, as illustrated in FIG. 9, is subsequently filled with aluminium 40 by flame spraying. As described hereinbefore, a further machining operation is then performed to form the flat and to ensure that the bearing block is of the desired diameter. Such a machining operation removes much of the bearing block material located radially outwardly of the insert 34. It is desirable that the machining does not extend beyond the centre line of the insert such that it remains positively retained within the bearing block. In use, the engagement of the bearing block and insert with an adjacent bearing block and insert prevents radial movement of the insert relative to the bearing block, so the removal of this material will not result in movement of the insert being permitted. Axial movement of the insert 34 to result in the insert 34 projecting beyond the bearing surface 30 is prevented by the step 46 of the inert 34 engaging the corresponding step of the recess 32.

The use of stepped, rather than tapering, forms is thought to be advantageous in that differential thermal expansion is unlikely to result in the application of forces to the insert causing axial movement thereof, and the machining operations are also less likely to cause axial movement of a stepped insert than a tapering insert located by being an interference fit. Manufacture is therefore simplified.

Although the use of stepped generally cylindrical forms is described, it will be appreciated that the insert and recess could be of other stepped shapes. Further, the insert and recess could, if desired, have more than one step formed thereon and the insert may also be arranged to be an interference fit into the recess for greater integrity.

It will be appreciated that a range of modifications or alterations to the arrangement described hereinbefore are possible within the scope of the invention.

The invention claimed is:

1. A gear pump arrangement comprising a pair of intermeshing gears located between bearing blocks and rotatable to pump fluid from an inlet to an outlet, the bearing blocks having a bearing surface facing the gears, wherein at least one of the bearing blocks comprises a body formed with a recess within which an insert is located, the recess and insert being shaped so as to be of smaller dimensions at the bearing surface of the bearing block than at a point remote therefrom within the bearing block, wherein the recess and insert are both of stepped generally cylindrical or part-cylindrical form.

2. An arrangement according to claim 1, wherein the steps of the stepped recess and insert are of tapering form.

3. An arrangement according to claim 1, wherein the recess and insert are of tapering shape.

4. An arrangement according to claim 1, wherein the insert is of aluminium bronze.

5. An arrangement according to claim 1, wherein the insert is flush or substantially flush with the bearing surface.

6. An arrangement according to claim 1, wherein the bearing block is provided with aluminium filled recess.

7. An arrangement according to claim 6, wherein the aluminium located within the aluminium filled recess serves to resist release of the insert from its recesses.

8. A bimetallic bearing block for use in a gear pump arrangement having a pair of intermeshing gears located between bearing surfaces of bearing blocks and rotatable to pump fluid from an inlet to an outlet, the bearing block comprising a body defining a recess within which an insert is located, the insert and recesses being shaped so as to be of small dimensions at the bearing surface of the bearing block than at a point remove therefrom within the bearing block, wherein the recess and insert are both of stepped generally cylindrical or part-cylindrical form.

9. A method of manufacture of a bimetallic bearing block having a bearing surface, the method comprising providing a recess in a bearing block body, introducing an insert into the recess of the bearing block body and flame spraying aluminium onto the bearing block body to resist release of the insert from the recess, the insert and recess being shaped so as to be of smaller dimensions at the bearing surface of the bearing block than at a point remote therefrom within the bearing block, wherein the recess and insert are both of stepped generally cylindrical or part-cylindrical form.

* * * * *

UNITED STATES PATENT AND TRADEMARK OFFICE
CERTIFICATE OF CORRECTION

PATENT NO. : 7,607,906 B2 Page 1 of 1
APPLICATION NO. : 11/433098
DATED : October 27, 2009
INVENTOR(S) : Yates et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 560 days.

Signed and Sealed this

Twelfth Day of October, 2010

David J. Kappos
*Director of the United States Patent and Trademark Office*